United States Patent
Dong et al.

(10) Patent No.: US 9,857,172 B1
(45) Date of Patent: Jan. 2, 2018

(54) METHOD FOR IMPLEMENTING HIGH-PRECISION ORIENTATION AND EVALUATING ORIENTATION PRECISION OF LARGE-SCALE DYNAMIC PHOTOGRAMMETRY SYSTEM

(71) Applicant: Beijing Information Science and Technology University, Beijing (CN)

(72) Inventors: Mingli Dong, Beijing (CN); Peng Sun, Beijing (CN); Wei Li, Beijing (CN); Jun Wang, Beijing (CN); Bixi Yan, Beijing (CN); Naiguang Lv, Beijing (CN)

(73) Assignee: BEIJING INFORMATION SCIENCE AND TECHNOLOGY UNIVERSITY, Beijing (CN)

( * ) Notice: Subject to any disclaimer, the term of this patent is extended or adjusted under 35 U.S.C. 154(b) by 0 days.

(21) Appl. No.: 15/714,070

(22) Filed: Sep. 25, 2017

(51) Int. Cl.
| | |
|---|---|
| G06K 9/36 | (2006.01) |
| G01C 11/10 | (2006.01) |
| G01C 11/14 | (2006.01) |
| G06T 7/80 | (2017.01) |
| G06T 7/77 | (2017.01) |
| G06T 3/40 | (2006.01) |
| G06T 7/73 | (2017.01) |
| G06F 17/18 | (2006.01) |

(52) U.S. Cl.
CPC .............. *G01C 11/10* (2013.01); *G01C 11/14* (2013.01); *G06T 3/40* (2013.01); *G06T 7/75* (2017.01); *G06T 7/77* (2017.01); *G06T 7/85* (2017.01); *G06F 17/18* (2013.01); *G06T 2200/21* (2013.01)

(58) Field of Classification Search
CPC ........... G01C 11/10; G01C 11/14; G06T 7/85; G06T 7/77; G06T 7/75; G06T 3/40; G06T 2200/21; G06F 17/18
See application file for complete search history.

(56) References Cited

U.S. PATENT DOCUMENTS

| | | | |
|---|---|---|---|
| 2013/0223693 A1* | 8/2013 | Chamberlain | A01K 73/10 382/110 |
| 2015/0085297 A1* | 3/2015 | Hughes | G01S 17/42 356/482 |
| 2016/0077515 A1* | 3/2016 | Pfeffer | B23Q 3/155 700/160 |
| 2017/0094251 A1* | 3/2017 | Wolke | G06T 7/521 |
| 2017/0191822 A1* | 7/2017 | Becker | G01S 17/023 |

\* cited by examiner

*Primary Examiner* — Amara Abdi
(74) *Attorney, Agent, or Firm* — Locke Lord LLP; Tim Tingkang Xia, Esq.

(57) ABSTRACT

The present invention provides a method for implementing high-precision orientation and evaluating orientation precision of a large-scale dynamic photogrammetry system, including steps: a) selecting a scale bar, arranging code points at two ends of the scale bar, and performing length measurement on the scale bar; b) evenly dividing a measurement space into multiple regions, sequentially placing the scale bar in each region, and photographing the scale bar by using left and right cameras; d) limiting self-calibration bundle adjustment by using multiple length constraints, adjustment parameters including principal point, principal distance, radial distortion, eccentric distortion, in-plane distortion, exterior orientation parameter and spatial point coordinate; and e) performing traceable evaluation of orientation precision of the photogrammetry system. The present invention can effectively reduce the relative error in length measurement.

10 Claims, 4 Drawing Sheets

METHOD FOR IMPLEMENTING HIGH-PRECISION ORIENTATION AND EVALUATING ORIENTATION PRECISION OF LARGE-SCALE DYNAMIC PHOTOGRAMMETRY SYSTEM

FIELD OF THE INVENTION

The present invention relates to a method for implementing high-precision orientation and evaluating orientation precision, and more particularly to a method for implementing high-precision orientation and evaluating orientation precision of a large-scale dynamic photogrammetry system.

BACKGROUND OF THE INVENTION

A dynamic photogrammetry system includes two or more cameras that can capture images at a high speed. The cameras synchronously capture images of a target point to be measured. By calibrating projection imaging models of the cameras, spatial light may be restored from image plane points, and spatial coordinates of the point to be measured may be calculated from an intersection of the spatial light. Imaging models of cameras include interior and exterior orientation parameter types. Interior orientation parameters include principal point, principal distance and various distortion parameters of different orders. Exterior orientation parameters include the position and directional angle of the camera in a spatial coordinate system. Finding a solution of the exterior orientation parameter is to perform positioning and orientation of the photogrammetry system.

Currently, it is generally recognized that a self-calibration bundle adjustment method can provide the highest positioning and orientation precision, because this technology considers the influence of the interior orientation parameters on the measurement result during adjustment and the obtained interior and exterior orientation parameter results are optimal results that match the measurement environment and the measurement network. The most commonly used self-calibration methods in the field of stereo vision measurement are Tsai's two-stage calibration method and Zhang Zhengyou's plane calibration method. Commonly used calibration objects include a three-dimensional calibration object, a planar checkerboard calibration plate, a flat dot calibration plate, and so on. The essence of such calibration methods is to generate a measurement network having several control points through relative movement of the calibration object and the camera, so as to implement self-calibration bundle adjustment of a single camera, and then solving an orientation relationship between the two cameras in a same coordinate system.

Such methods have been applied to machine vision, structured light measurement, and high-precision large-scale stereo vision measurement systems. Such self-calibration methods are suitable for small measurement ranges (generally smaller than 1 m*1 m), because the precision and the size of the calibration object are inversely proportional to each other. When such methods are used for structured light measurement in a small space or microscopic measurement, a desirable calibration precision can be obtained.

Such self-calibration methods have the following defects: the focus of the adjustment process is the interior orientation parameter, and there is no direct optimization or evaluation on the orientation relationship between cameras; coordinate precision of target points on the calibration plate that are used as control points leads to a system error; differences between the target points on the calibration plate and the measurement points in material and imaging quality lead to a system error; in addition to the image plane error or spatial coordinate error estimation, there is no reliable objective spatial evaluation indicators. Therefore, such method are not suitable for large-scale measurement occasions having high requirements on precision and precision traceable.

SUMMARY OF THE INVENTION

To solve the above-mentioned technical problem, the present invention provides a method for implementing high-precision orientation and evaluating orientation precision of a large-scale dynamic photogrammetry system, including steps:

a) selecting a scale bar, arranging code points at two ends of the scale bar, and performing length measurement on the scale bar;

b) evenly dividing a measurement space into multiple regions, sequentially placing the scale bar in each region, and photographing the scale bar by using left and right cameras, where continuous photographing is carried out in the following manner:

b1) adjusting left and right cameras so that fields of view of the left and right cameras fully cover the scale bar, synchronously moving the left and right cameras along a perpendicular direction of a line connecting the code points at the two ends of the scale bar, and at the same time rotating the scale bar by using the perpendicular direction of the line connecting the code points at the two ends of the scale bar as an axis of rotation; and b2) adjusting the left and right cameras, synchronously moving the left and right cameras along the perpendicular direction of the line connecting the code points at the two ends of the scale bar in a direction opposite to that in the step b1), and at the same time rotating the scale bar in a direction opposite to that in the step b1);

c) performing preliminary relative positioning and orientation of the photogrammetry system according to images shot by the left and right cameras;

d) limiting self-calibration bundle adjustment by using multiple length constraints, adjustment parameters including principal point, principal distance, radial distortion, eccentric distortion, in-plane distortion, exterior orientation parameter and spatial point coordinate;

e) performing traceable evaluation of orientation precision of the photogrammetry system.

Preferably, a distance between the left and right cameras is the same as a region length according to which the measurement space is evenly divided.

Preferably, the photographing process of the step b) is repeated multiple times.

Preferably, the step c includes steps:

c1) determining a solution space of a fundamental matrix by using a five-point method: automatically selecting five imaging points in a position of the scale bar, where positions of the imaging points are a center and four vertexes of the shot image, and the automatic selection is performed using the following algorithm:

$$\text{abs}(xl_i) + \text{abs}(yl_i) + \text{abs}(xr_i) + \text{abs}(yr_i) \rightarrow \min$$

$$(xl_i) + (yl_i) + (xr_i) + (yr_i) \rightarrow \max$$

$$(-xl_i) + (yl_i) + (-xr_i) + (yr_i) \rightarrow \max$$

$$(-xl_i) + (-yl_i) + (-xr_i) + (-yr_i) \rightarrow \max$$

$$(xl_i) + (-yl_i) + (xr_i) + (-yr_i) \rightarrow \max$$

where [xli yli] represents image plane coordinates of the $i^{th}$ point captured by the left camera, and [xri yri] represents image point coordinates of the $i^{th}$ point captured by the right camera; and c2) obtaining a solution of an essential matrix by using an elimination method.

Preferably, the obtaining of the solution of the essential matrix in the step c2) includes the following key steps:

c21) building a tenth-degree polynomial of an unknown number w;

c22) solving a real root of the tenth-degree polynomial in the step c21; and c23) judging the solution of the essential matrix.

Preferably, in a method of building the tenth-degree polynomial of w in the step c21, a Toeplitz matrix is used:

c211) describing all polynomials as an array:

$$a_m x^m + A_{m-1} x^{m-1} + \ldots + a_2 x^2 + a_1 x + a_0 \ A = [a_m a_{m-1} \ldots a_2 a_1 a_0]^T$$

$$b_n x^n + b_{n-1} x^{n-1} + \ldots + b_2 x^2 + b_1 x + b_0 \ B = [b_n b_{n-1} \ldots b_2 b_1 b_0]^T; \text{ and}$$

c212) performing programming by using the Toeplitz matrix to compute polynomial multiplication, with a formula being:

$$C = T * B = \begin{bmatrix} a_m & 0 & 0 & \ldots & 0 \\ a_{m-1} & a_m & 0 & \ldots & 0 \\ a_{m-2} & a_{m-1} & a_m & \ldots & 0 \\ \vdots & \vdots & \vdots & \vdots & \vdots \\ 0 & a_0 & a_1 & \ldots & a_m \\ \vdots & \vdots & \vdots & \vdots & \vdots \\ 0 & 0 & 0 & 0 & a_0 \end{bmatrix} \begin{bmatrix} b_n \\ b_{n-1} \\ \vdots \\ b_1 \\ b_0 \end{bmatrix}$$

where T is a Toeplitz matrix corresponding to a polynomial A, a quantity of columns in T is equal to a quantity of elements in B, and a quantity of rows in T is equal to $(m+1)+(n+1)-1$.

Preferably, the step c212 may further include: performing programming by using the Toeplitz matrix to compute polynomial division, specifically including the following steps:

c213) describing n as $n=T(d)q+r$ by using a Toeplitz matrix of d, where it is set that a numerator polynomial is n, a denominator polynomial is d, a quotient is q, and a remainder is r; and c214) calculating an optimal solution of a quotient of the polynomial division: $q=(T^T T)^{-1} T^T n$.

Preferably, a method for solving the real root of the tenth-degree polynomial in the step c22 is:

c221) building a Sturm sequence of the tenth-degree polynomial, with a formula being:

$$p_0(x)=p(x)$$

$$p_1(x)=p'(x)$$

$$p_2(x)=-\text{rem}(p_0, p_1)$$

$$p_3(x)=-\text{rem}(p_1, p_2)$$

.

.

.

$$0=-\text{rem}(p_{m-1}, p_m)$$

where rem represents calculating the remainder of the polynomial, and P(x) is a known tenth-degree polynomial;

c222) searching all single intervals of the polynomial by recursive dichotomy in combination with the Sturm's Theorem; and c223) after the single intervals are obtained, calculating a numerical solution of a real root of $|C(w)|=0$ in each single interval by dichotomy.

Preferably, the step d includes the following steps:

d1) obtaining a camera imaging model;

d2) building an error equation of the photogrammetry system;

d3) performing adaptive proportional adjustment of error equation terms;

d4) performing a partitioning operation on the normal equation;

d5) obtaining self-calibration bundle adjustment with length constraints; and d6) evaluating precision of the photogrammetry system.

Preferably, the step e performing traceable evaluation of orientation precision of the photogrammetry system is performed by using direct linear transformation, and includes the following steps:

e1) obtaining an error equation of a single imaging point;

e2) when the photogrammetry system includes two cameras, obtaining an error equation set corresponding to a spatial point [X Y Z];

e3) obtaining a corresponding normal equation and coordinate correction amount, and optimizing spatial point coordinates through multiple iterations;

e4) obtaining a measured value of a corresponding length of the scale bar through the step e3;

e5) obtaining an average value of measurement results of lengths of the scale bar in all orientations;

e6) performing scaling by using a ratio of an average length to a gage length as an orientation result, and performing an uncertainty analysis on the length measurement result, to obtain an orientation precision evaluation;

e7) obtaining a quality parameter of a measurement instrument;

e8) calculating a relative error of each length; and e9) calculating an uncertainty of the relative error in length measurement.

Based on the above, according to the method for high-precision positioning and orientation of a large-scale multi-camera photogrammetry system of the present invention, the photogrammetry system remains stable, positioning and orientation are completed at the measurement site, the calibration object is convenient to process and measure, and the calibration process is simple. Once the orientation process is completed, traceable evaluation of the length measurement error of the photogrammetry system can be provided. The present invention achieves the following technical effects:

1. In the present invention, the measurement space is divided into regions so that the distance between the left and right cameras is equal to the region length of the divided space, and the gauge attitude and the camera position are adjusted at the same time during the photographing process, making the length orientation field more reliable.

2. A method for numerical computation of relative orientation by using a five-point method and a technology for feasible solution judgment by using spatially orthogonal length constraints.

3. Multi-camera self-calibration bundle adjustment is indirect adjustment with multiple constraint conditions. Reference lengths of multiple positions and attitudes are used as three-dimensional constraint conditions to control the entire adjustment, so that the correlation between interior and exterior orientation parameter can be decoupled, thereby implementing full-parameter self-calibration bundle adjustment (including principal point, principal distance, radial distortion, eccentric distortion, in-plane distortion, exterior orientation parameter and spatial point coordinate).

4. When the orientation process is completed, traceable precision evaluation of the entire positioning and orientation process is performed by using a statistical result of multiple length measurement errors.

BRIEF DESCRIPTION OF THE DRAWINGS

To describe the technical solutions in the embodiments of the present invention or the prior art more clearly, the drawings that need to be used in the embodiments or the prior art are briefly introduced. It would be obvious that the drawings in the following description are merely some embodiments of the present invention, and those of ordinary skill in the art may further obtain other drawings according to these drawings without creative efforts.

DETAILED DESCRIPTION OF THE INVENTION

Figure 1:
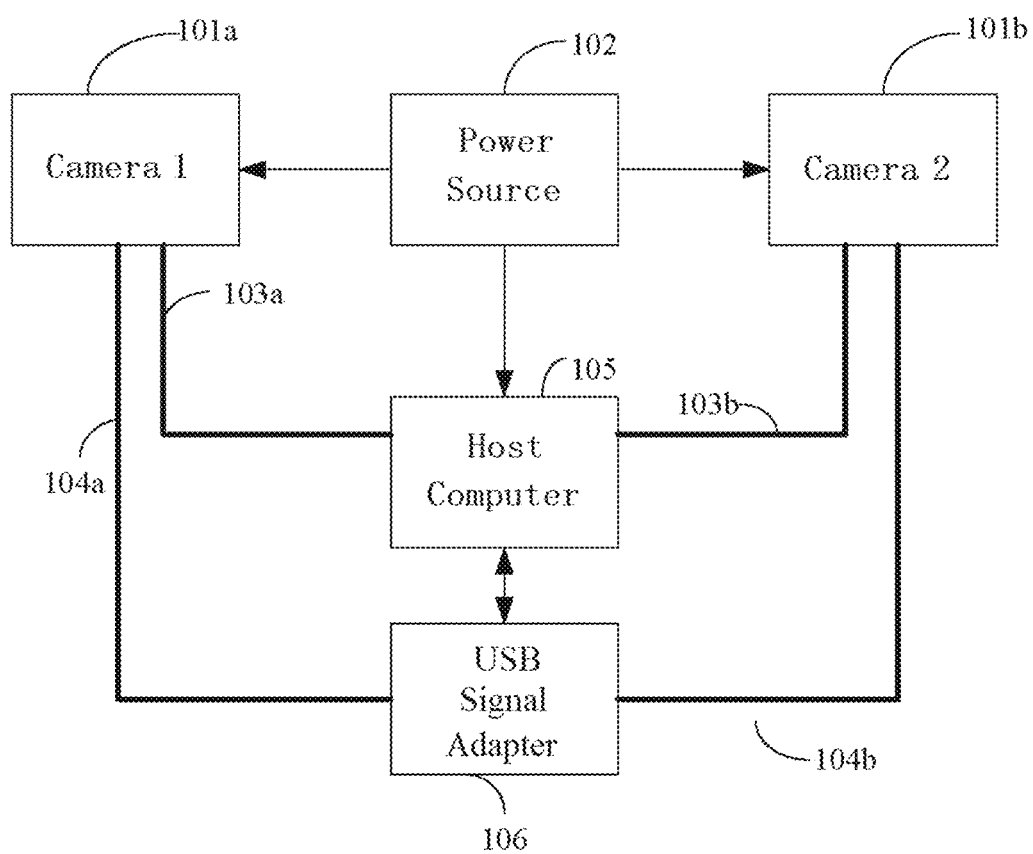
FIG. 1 is an experimental assembly of a method for high-precision positioning and orientation of a large-scale multi-camera photogrammetry system according to the present invention.

The objectives and functions of the present invention and methods for achieving such objectives and functions will be illustrated through exemplary embodiments. However, the present invention is not limited to the exemplary embodiments disclosed below, but may be implemented in different forms. The essence of this specification is merely for the purpose of helping those skilled in the art to comprehensively understand the specific details of the present invention.

The present invention provides a large-scale dynamic photogrammetry system. The system includes a camera 101, a power source 102, a network cable 103, a signal line 104 and a host computer 105. The power source 102 supplies power to the camera 1, the camera 2 and the host computer 105. A network cable 103*a* is connected between the camera 1 and the host computer 105, and a network cable 103*b* is connected between the camera 2 and the host computer 105, for providing communication between the cameras and the host computer. A signal line 104*a* is connected to the camera 1 and the host computer 105, and a signal line 104*b* is connected to the camera 2 and the host computer 105, for transmitting signals between the host computer 105 and the camera 101. The host computer 105 is further equipped with a USB signal adapter. The host computer 105 sends a synchronization signal via the USB signal adapter 106, and controls the two cameras 101 via the signal line 104 to synchronously capture images.

Figure 2:
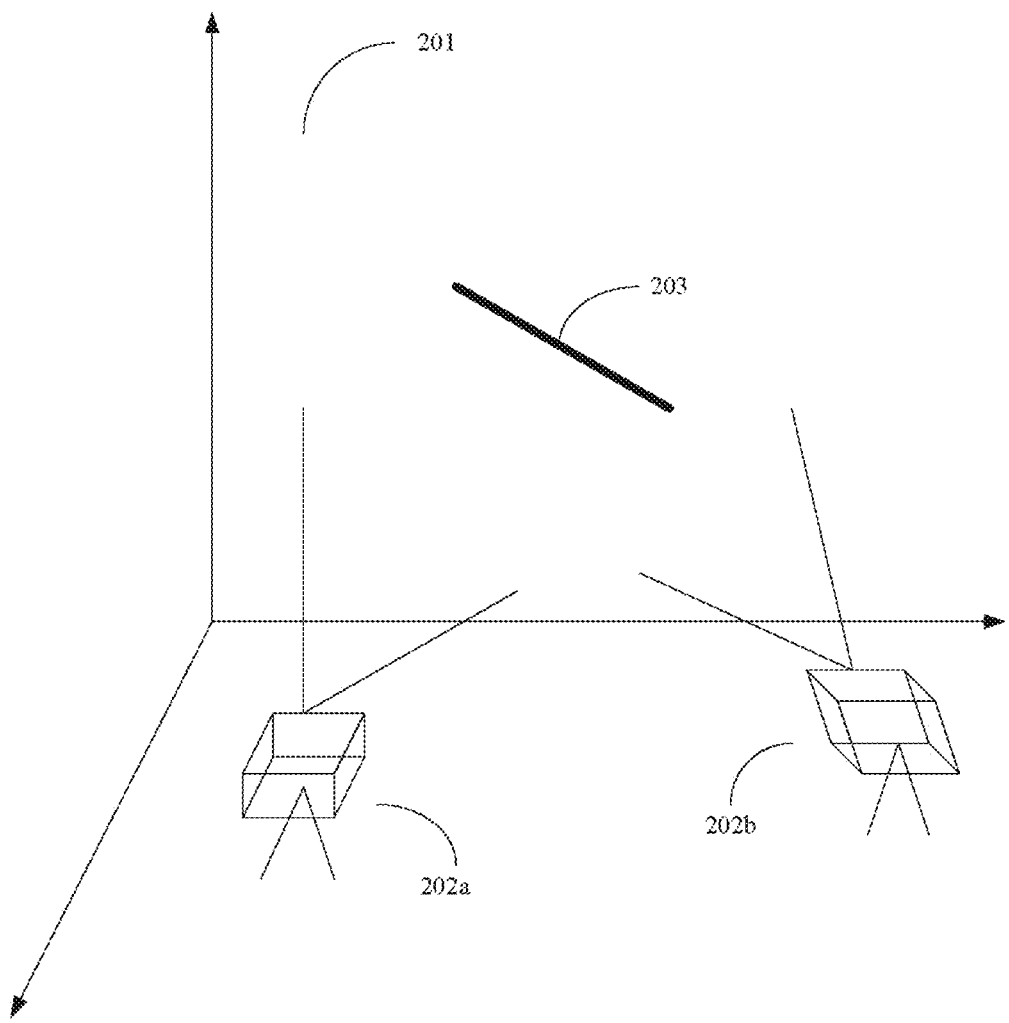
FIG. 2 is a schematic experimental diagram of the system.

FIG. 2 is a schematic experimental diagram of the system. The measurement space 201 mainly includes two cameras 202 and a scale bar 203. The measurement space 201 provides an experimental verification environment for the method for implementing high-precision orientation and evaluating orientation precision of the system.

The present invention provides a method for implementing high-precision orientation and evaluating orientation precision of a large-scale dynamic photogrammetry system, including steps:

a) selecting a scale bar, arranging code points at two ends of the scale bar, and performing length measurement on the scale bar.

b) evenly dividing a measurement space into multiple regions, sequentially placing the scale bar in each region, and photographing the scale bar by using left and right cameras, where continuous photographing is carried out in the following manner:

b1) adjusting left and right cameras so that fields of view of the left and right cameras fully cover the scale bar, synchronously moving the left and right cameras along a perpendicular direction of a line connecting the code points at the two ends of the scale bar, and at the same time rotating the scale bar by using the perpendicular direction of the line connecting the code points at the two ends of the scale bar as an axis of rotation; and b2) adjusting the left and right cameras, synchronously moving the left and right cameras along the perpendicular direction of the line connecting the code points at the two ends of the scale bar in a direction opposite to that in the step b1), and at the same time rotating the scale bar in a direction opposite to that in the step b1);

c) performing preliminary relative positioning and orientation of the photogrammetry system according to images shot by the left and right cameras, where in the photographing process, a distance between the left and right cameras is the same as a region length according to which the measurement space is evenly divided, and preferably, in some embodiments, the photographing process of the step b) is repeated multiple times.

d) limiting self-calibration bundle adjustment by using multiple length constraints, adjustment parameters including principal point, principal distance, radial distortion, eccentric distortion, in-plane distortion, exterior orientation parameter and spatial point coordinate.

e) performing traceable evaluation of orientation precision of the photogrammetry system.

Figure 3:
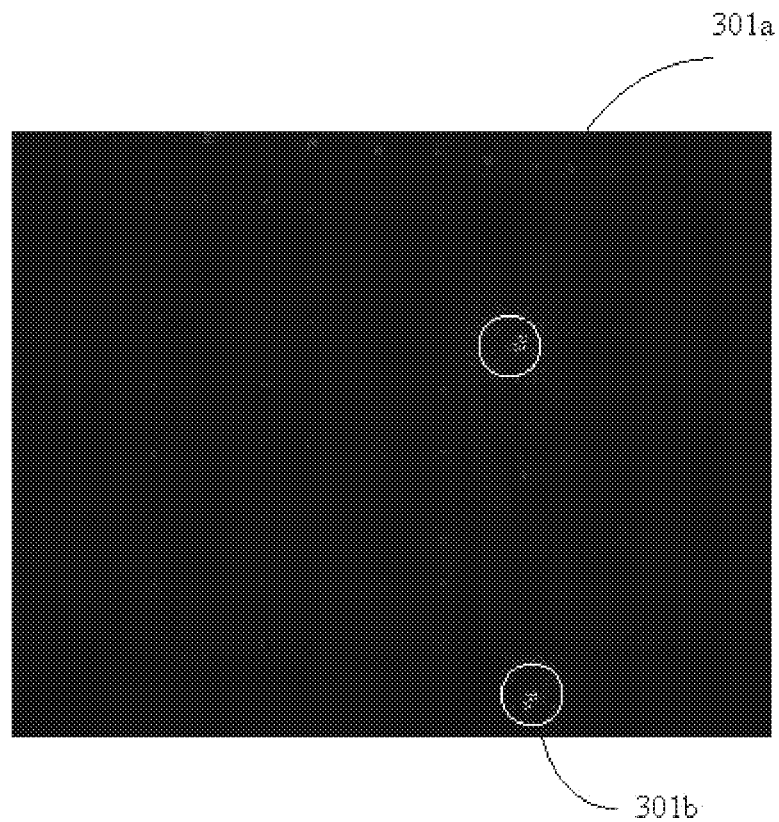
FIG. 3 shows images of a scale bar in two cameras in the system.

Based on the method of the step b, the scale bar of the present invention is designed and calibrated through the following operations:

The main body of the scale bar is a carbon fiber bar, and two backlight reflection code points are fixed at two ends of the bar as endpoints for length measurement. During calibration, the scale bar at a particular position is imaged in two cameras. As shown in FIG. 3, white point areas are backlight reflection points 301 adhered at two ends of the scale bar.

Figure 4:
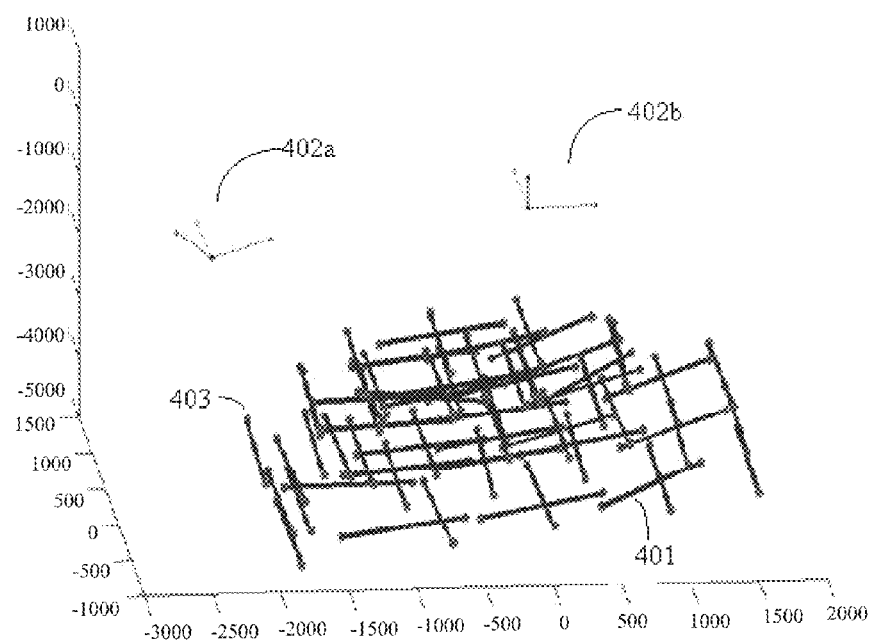
FIG. 4 is a diagram showing the relative positions between scale bars at different positions and attitudes in space and two cameras.

As shown in FIG. 4, the three-dimensional space includes coordinates 402 of the two cameras and multiple scale bars 401 at different positions, and backlight reflection points 403 are adhered at two ends of the scale bar and used for calibrating the length of the scale bar. The number of images shot should be not less than 60.

Step c:

According to an embodiment of the present invention, the step c includes the following steps:

c1) determining a solution space of a fundamental matrix by using a five-point method: automatically selecting five imaging points in a position of the scale bar, where positions of the imaging points are a center and four vertexes of the shot image, and the automatic selection is performed using the following algorithm:

$$\text{abs}(xl_i)+\text{abs}(yl_i)+\text{abs}(xr_i)+\text{abs}(yr_i) \to \min$$

$$(xl_i)+(yl_i)+(xr_i)+(yr_i) \to \max$$

$$(-xl_i)+(yl_i)+(-xr_i)+(yr_i) \to \max$$

$$(-xl_i)+(-yl_i)+(-xr_i)+(-yr_i) \to \max$$

$$(xl_i)+(-yl_i)+(xr_i)+(-yr_i) \to \max \tag{3.1}$$

where [xli yli] represents image plane coordinates of the $i^{th}$ point captured by the left camera, and [xri yri] represents image point coordinates of the $i^{th}$ point captured by the right camera;

The point satisfying the above formulas is a point closest to the expected position.

The corresponding image point satisfies:

$$X'^T E X = 0 \qquad (3.2)$$

where E is an essential matrix, and X and X' are respectively coordinates obtained by normalizing respective intrinsic parameters of corresponding points on left and right images.

Five points are selected and substituted into the above formula, to obtain the following equation set:

$$\begin{bmatrix} X_1'X_1 & X_1'Y_1 & X_1'Z_1 & Y_1'X_1 & Y_1'Y_1 & Y_1'Z_1 & Z_1'X_1 & Z_1'Y_1 & Z_1'Z_1 \\ X_2'X_2 & X_2'Y_2 & X_2'Z_2 & Y_2'X_2 & Y_2'Y_2 & Y_2'Z_2 & Z_2'X_2 & Z_2'Y_2 & Z_2'Z_2 \\ \vdots & \vdots & \vdots & \vdots & \vdots & \vdots & \vdots & \vdots & \vdots \\ X_5'X_5 & X_5'Y_5 & X_5'Z_5 & Y_5'X_5 & Y_5'Y_5 & Y_5'Z_5 & Z_5'X_5 & Z_5'Y_5 & Z_5'Z_5 \end{bmatrix} \qquad (3.3)$$

$$\begin{bmatrix} e_{11} \\ e_{12} \\ e_{13} \\ e_{21} \\ e_{22} \\ e_{23} \\ e_{31} \\ e_{32} \\ e_{33} \end{bmatrix} = \begin{bmatrix} 0 \\ 0 \\ 0 \\ 0 \\ 0 \\ 0 \\ 0 \\ 0 \\ 0 \end{bmatrix}$$

A fundamental system of solutions of the above formula is obtained by singular value decomposition (SVD), thus extending a solution space of the essential matrix:

$$E = w E_w + x E_x + y E_y + E_z \qquad (3.4)$$

c2) obtaining a solution of an essential matrix by using an elimination method;

The essential matrix has the following two natures:

$$|E| = 0$$

$$2 E E^T E - tr(E E^T) E = 0 \qquad (3.5)$$

Ten equations of unknown numbers w, x, y may be obtained by using the above formulas. The ten equations are rewritten by using x, y, $x^2$, xy, $y^2$, $x^3$, $x^2 y$, $xy^2$ and $y^3$ as unknown variables and was a known variable, to eliminate x and y. The following equation set is obtained:

$$C(w)_{10 \times 10} \begin{bmatrix} 1 \\ x \\ y \\ x^2 \\ xy \\ y^2 \\ x^3 \\ x^2 y \\ xy^2 \\ y^3 \end{bmatrix} = 0 \qquad (3.6)$$

where C(w) is a polynomial matrix of w.

The homogeneous linear equation set described by the formula (3.6) has a non-zero solution, and therefore the determinant of C(w) is zero. Theoretically, a polynomial expressed by the determinant of C(w) is described, and a root of the polynomial is solved, thus obtaining numerical solutions of w and C(w); further, values of x and y can be obtained by calculating a non-zero solution of the formula (3.6). This inevitably involves the description of the polynomial of a 10-order symbolic matrix determinant, and how to solve a real root of a higher-degree polynomial.

According to an embodiment of the present invention, the obtaining of the solution of the essential matrix in the step c2) includes the following key steps:

c21) building a tenth-degree polynomial of an unknown number w;

A solution of the determinant is calculated by programming using the following method which is suitable for both symbolic polynomial and numerical operations:

m=1;
for k=1: n−1
  for I=k+1: n
    for j=k+1: n
      A(i, j)=(A(k, k)A(i, j)−A(I, k)A(k, j))/m;
    end
  end
  m=A(k, k);
end
return A(n, n);

The above algorithm involves polynomial multiplication and division.

According to an embodiment of the present invention, in a method of building the tenth-degree polynomial of w in the step c21, programming and computation are performed by using a Toeplitz matrix, with a method being:

c211) describing all polynomials as an array:

$$a_m x^m + A_{m-1} x^{m-1} + \ldots + a_2 x^2 + a_1 x + a_0 \quad A = [a_m a_{m-1} \ldots a_2 a_1 a_0]^T$$

$$b_n x^n + b_{n-1} x^{n-1} + \ldots + b_2 x^2 + b_1 x + b_0 \quad B = [b_n b_{n-1} \ldots b_2 b_1 b_0]^T \qquad (3.7)$$

c212) performing programming by using the Toeplitz matrix to compute polynomial multiplication, with a formula being:

$$C = T * B = \begin{bmatrix} a_m & 0 & 0 & \ldots & 0 \\ a_{m-1} & a_m & 0 & \ldots & 0 \\ a_{m-2} & a_{m-1} & a_m & \ldots & 0 \\ \vdots & \vdots & \vdots & \vdots & \vdots \\ 0 & a_0 & a_1 & \ldots & a_m \\ \vdots & \vdots & \vdots & \vdots & \vdots \\ 0 & 0 & 0 & 0 & a_0 \end{bmatrix} \begin{bmatrix} b_n \\ b_{n-1} \\ \vdots \\ b_1 \\ b_0 \end{bmatrix} \qquad (3.8)$$

where T is a Toeplitz matrix corresponding to a polynomial A, a quantity of columns in T is equal to a quantity of elements in B, and a quantity of rows in T is equal to (m+1)+(n+1)−1.

According to an embodiment of the present invention, the step c212 may further include: performing programming by using the Toeplitz matrix to compute polynomial division, specifically including the following steps:

c213) describing n as n=T(d)q+r by using a Toeplitz matrix of d, where it is set that a numerator polynomial is n, a denominator polynomial is d, a quotient is q, and a remainder is r; and c214) calculating an optimal solution of a quotient of the polynomial division: $q = (T^T T)^{-1} T^T n$.

The method of solving the polynomial division by using the Toeplitz matrix does not have the error accumulation phenomenon of a long division method and can avoid the ill-conditioned problem of division of a large number by a small number. The obtained result is an optimal solution in the least squares sense.

c22) solving a real root of the tenth-degree polynomial in the step c21;

Solving the real root of the higher-degree polynomial can rely only on a numerical method such as Newton's method and dichotomy, but the key problem lies in determining a single interval.

According to an embodiment of the present invention, single intervals are searched by using the Sturm's Theorem in the present invention. For a known polynomial P(x), its Sturm sequence may be determined:

$$p_0(x)=p(x)$$

$$p_1(x)=p'(x)$$

$$p_2(x)=-\text{rem}(p_0,p_1)$$

$$p_3(x)=-\text{rem}(p_1,p_2)$$

.

.

.

$$0=-\text{rem}(p_{m-1},p_m) \quad (3.9)$$

where rem represents calculating the remainder of the polynomial.

The Sturm's Theorem describes the number of real roots of the polynomial P(x) within an interval (a, b]. Assuming that the sign change frequency of the function value of the Sturm sequence at the endpoint a is c(a) and the sign change frequency of the function value of the Sturm sequence at the endpoint b is c(b), the number of real roots of the polynomial P(x) within this half-open interval is c(a)−c(b). In the present technology, a recursive dichotomy technique is designed, and all single intervals are searched in a wide numerical range (a, b), with pseudo-code of the corresponding function being shown as follows:

determining the Sturm sequence sturmSequence of the polynomial P(x);

function [rootIntervals]=rootIntervalsDetect(a, b, sturmSequence)

determining the number of real roots, numRoot, within (a, b] by using the Sturm's Theorem;

rootRegion=[ ];
if numRoot<1
elseif numRoot==1
rootRegion=[rootRegion; a b];
elseif numRoot>1
a1=a; b1=(a+b)/2;
a2=(a+b)/2; b2=b;
o1=rootIntervalsDetect(a1, b1, sturmSequence);
rootRegion=[rootRegion; o1];
o2=rootIntervalsDetect(a2, b2, sturmSequence);
rootRegion=[rootRegion; o2];
end After single intervals are obtained, the real root of |C(w)|=0 is solved in each single interval by dichotomy. The solved w is substituted into the expression of C(w) in the formula (3.6), unknown terms about x and y are solved by SVD, and values of x and y are further obtained. The solved w, x and y are substituted into the formula (3.4), to obtain the essential matrix E, the number of solutions of which is the same as the number of real roots of w.

c23) judging the solution of the essential matrix.

Each w has a camera position relationship and corresponding reconstructed spatial point coordinates. In special cases, for example, imaging of a planar scene, a feasible solution cannot be judged according to the conventional criterion of smallest image plane error, because there are two solution having similar image plane errors. To fundamentally solve the root judgment problem, the present technology uses spatial information as a constraint and a length ratio of two scale bars at orthogonal positions as a criterion of judgment. An essential matrix whose reconstructed space length ratio is closest to 1 is the final feasible solution.

Further, the translation amount and the spatial coordinates are scaled according to the ratio of the space length to the reconstructed length. The obtained exterior orientation parameter and spatial coordinates may be used as initial parameter values for subsequent self-calibration bundle adjustment.

Step d:

According to an embodiment of the present invention, the step d includes the following steps:

d1) obtaining a camera imaging model;

The camera orientation is described by using $[X_0\ Y_0\ Z_0\ Az\ El\ Ro]^T$, coordinates of a spatial point are $[X\ Y\ Z]^T$, and coordinates $[\overline{X}\ \overline{Y}\ \overline{Z}]^T$ in a camera coordinate system are described as:

$$\begin{bmatrix} \overline{X} \\ \overline{Y} \\ \overline{Z} \end{bmatrix} = R\left(\begin{bmatrix} X \\ Y \\ Z \end{bmatrix} - \begin{bmatrix} X_0 \\ Y_0 \\ Z_0 \end{bmatrix}\right) = \begin{bmatrix} a_1 & b_1 & c_1 \\ a_2 & b_2 & c_2 \\ a_3 & b_3 & c_3 \end{bmatrix}\left(\begin{bmatrix} X \\ Y \\ Z \end{bmatrix} - \begin{bmatrix} X_0 \\ Y_0 \\ Z_0 \end{bmatrix}\right) \quad (4.1)$$

where $$R = \begin{bmatrix} \cos(Ro)\cos(Az) + \sin(Ro)\sin(El)\sin(Az) & \cos(Ro)\sin(Az) - \sin(Ro)\sin(El)\cos(Az) & \sin(Ro)\cos(El) \\ -\sin(Ro)\cos(Az) + \cos(Ro)\sin(El)\sin(Az) & -\sin(Ro)\sin(Az) - \cos(Ro)\sin(El)\cos(Az) & \cos(Ro)\cos(El) \\ \cos(El)\sin(Az) & -\cos(El)\cos(Az) & -\sin(El) \end{bmatrix} \quad (4.2)$$

Linear projection coordinates of this spatial point are:

$$x_l = -f\frac{\overline{X}}{\overline{Z}} = -f\frac{a_1(X-X_0)+b_1(Y-Y_0)+c_1(Z-Z_0)}{a_3(X-X_0)+b_3(Y-Y_0)+c_3(Z-Z_0)} \quad (4.3)$$

-continued $$y_l = -f\frac{Y}{Z} = -f\frac{a_2(X-X_0)+b_2(Y-Y_0)+c_2(Z-Z_0)}{a_3(X-X_0)+b_3(Y-Y_0)+c_3(Z-Z_0)}$$

An object distance of it relative to the imaging system is:

$$s'=-\bar{Z} \quad (4.4)$$

Researches show that a radial distortion parameter of a spatial point with an object distance of s' on the imaging plane of the imaging system is:

$$k_{1ss'} = \alpha_{s'}\frac{C_{s'}^2}{C_{s_1}^2}k_{1ss_1} + (1-\alpha_{s'})\frac{C_{s'}^2}{C_{s_2}^2}k_{1ss_2} \quad (4.5)$$

$$k_{2ss'} = \alpha_{s'}\frac{C_{s'}^4}{C_{s_1}^4}k_{2ss_1} + (1-\alpha_{s'})\frac{C_{s'}^4}{C_{s_2}^4}k_{2ss_2}$$

$$k_{3ss'} = \alpha_{s'}\frac{C_{s'}^6}{C_{s_1}^6}k_{3ss_1} + (1-\alpha_{s'})\frac{C_{s'}^6}{C_{s_2}^6}k_{3ss_2}$$

$$\alpha_{s'} = \frac{S_2-S'}{S_2-S_1}\cdot\frac{S_1-f}{S'-f}$$

where s is the focus length of the imaging system, $k_{1ss_1}$, $k_{2ss_1}$, $k_{3ss_1}$ and $k_{1ss_2}$, $k_{2ss_2}$, $k_{3ss_2}$ are calibration results of the radial distortion parameter over two distances, and $C_{s_1}$ and $C_{s_2}$ are respectively image distances of Gaussian imaging formulas corresponding to the two distances.

Assume that principal point offsets of the camera is $x_p$ and $y_p$, and eccentric distortion and in-plane distortion parameters corresponding to this spatial point are $P_1$, $P_2$, $B_1$, $B_2$. The image point distortion amount at $(x_l, y_l)$ is:

$$\Delta x = \bar{x}(K_{1ss'}r^2 + K_{2ss'}r^4 + K_{3ss'}r^6) + \quad (4.6)$$
$$P_1(2\bar{x}^2+r^2)+2P_2\bar{x}\bar{y}+B_1\bar{x}+B_2\bar{y}$$
$$\Delta y = \bar{y}(K_{1ss'}r^2 + K_{2ss'}r^4 + K_{3ss'}r^6) + P_2(2\bar{y}^2+r^2)+2P_1\bar{x}\bar{y}$$
$$\bar{x}=x-x_p \quad \bar{y}=y-y_p \quad r=\sqrt{\bar{x}^2+\bar{y}^2}$$

Therefore, final image point coordinates of the spatial point on the camera image plane at this position is:

$$x=x_l+x_p-\Delta x$$
$$y=y_l+y_p-\Delta y \Rightarrow \tilde{L}=\varphi(\tilde{X}) \quad (4.7)$$

The exterior orientation parameter and the spatial coordinates are correlated to the radial distortion parameter through s'.

d2) building an error equation of the photogrammetry system;

for a dual-camera photogrammetry system, using (xij, yij) to represent imaging coordinates of the $j^{th}$ point in space for the $i^{th}$ image, the error equation is:

$$\hat{l}_{ij} = l_{ij}+v_{ij} = K_{ij}\hat{x}_{ij} \Rightarrow \begin{bmatrix}x_{ij}-\varphi_x(X_{ij}^0)\\y_{ij}-\varphi_y(X_{ij}^0)\end{bmatrix}+\begin{bmatrix}v_{xij}\\v_{yij}\end{bmatrix}= \quad (4.8)$$

$$A_{ij}\begin{bmatrix}\Delta X_{0i}\\\Delta Y_{0i}\\\Delta Z_{0i}\\\Delta Az_i\\\Delta El_i\\\Delta Ro_i\\\Delta x_{0i}\\\Delta y_{0i}\\\Delta f_i\\\Delta K_{1i}\\\Delta K_{2i}\\\Delta K_{3i}\\\Delta P_{1i}\\\Delta P_{2i}\\\Delta B_{1i}\\\Delta B_{2i}\end{bmatrix}+B_{ij}\begin{bmatrix}\Delta X_j\\\Delta Y_j\\\Delta Z_j\end{bmatrix}=A_{ij}\delta_i+B_{ij}\delta_j$$

$$i=1,2; j=1,2,\ldots n$$

where $X_{ij}^0$ is all parameters related to the imaging point $(x_{ij}, y_{ij})$, $(v_{xij}, v_{yij})$ is a residual error, and $A_{ij}$ and $B_{ij}$ are Jacobian matrices of an imaging model (4.7) for the exterior orientation parameter of the $i^{th}$ image, coordinates of the $j^{th}$ spatial point, and the camera imaging parameter.

$$A_{ij}=\begin{bmatrix}\frac{\partial x_{ij}}{\partial X_{0i}} & \frac{\partial x_{ij}}{\partial Y_{0i}} & \frac{\partial x_{ij}}{\partial Z_{0i}} & \frac{\partial x_{ij}}{\partial Az_i} & \frac{\partial x_{ij}}{\partial El_i} & \frac{\partial x_{ij}}{\partial Ro_i} & \frac{\partial x_{ij}}{\partial x_p} & \frac{\partial x_{ij}}{\partial y_p} & \frac{\partial x_{ij}}{\partial f} & \frac{\partial x_{ij}}{\partial K_{1ss_2}} & \frac{\partial x_{ij}}{\partial K_{2ss_2}} & \frac{\partial x_{ij}}{\partial K_{3ss_2}} & \frac{\partial x_{ij}}{\partial P_1} & \frac{\partial x_{ij}}{\partial P_2} & \frac{\partial x_{ij}}{\partial B_1} & \frac{\partial x_{ij}}{\partial B_2}\\ \frac{\partial y_{ij}}{\partial X_{0i}} & \frac{\partial y_{ij}}{\partial Y_{0i}} & \frac{\partial y_{ij}}{\partial Z_{0i}} & \frac{\partial y_{ij}}{\partial Az_i} & \frac{\partial y_{ij}}{\partial El_i} & \frac{\partial y_{ij}}{\partial Ro_i} & \frac{\partial y_{ij}}{\partial x_p} & \frac{\partial y_{ij}}{\partial y_p} & \frac{\partial y_{ij}}{\partial f} & \frac{\partial y_{ij}}{\partial K_{1ss_2}} & \frac{\partial y_{ij}}{\partial K_{2ss_2}} & \frac{\partial y_{ij}}{\partial K_{3ss_2}} & \frac{\partial y_{ij}}{\partial P_1} & \frac{\partial y_{ij}}{\partial P_2} & \frac{\partial y_{ij}}{\partial B_1} & \frac{\partial y_{ij}}{\partial B_2}\end{bmatrix} \quad (4.9)$$

$$B_{ij}=\begin{bmatrix}\frac{\partial x_{ij}}{\partial X_j} & \frac{\partial x_{ij}}{\partial Y_j} & \frac{\partial x_{ij}}{\partial Z_j}\\ \frac{\partial y_{ij}}{\partial X_j} & \frac{\partial y_{ij}}{\partial Y_j} & \frac{\partial y_{ij}}{\partial Z_j}\end{bmatrix}$$

Each term in $A_{ij}$ is solved through the following process:

$$\frac{\partial C_{s'}}{\partial s'} = -\frac{f^2}{(s'-f)^2} \quad (4.10)$$

$$\frac{\partial \alpha_{s'}}{\partial s'} = -\frac{(S_1-f)(S_2-f)}{(S_2-S_1)(S'-f)^2}$$

$$\frac{\partial k_{1ss'}}{\partial s'} = \frac{\partial \alpha_{s'}}{\partial s'} \frac{C_{s'}^2}{C_{s_1}^2} k_{1ss_1} + 2\frac{\partial C_{s'}}{\partial s'} \frac{\alpha_{s'} C_{s'}}{C_{s_1}^2} k_{1ss_1} +$$

$$\left(-\frac{\partial \alpha_{s'}}{\partial s'}\right) \frac{C_{s'}^2}{C_{s_2}^2} k_{1ss_2} + 2\frac{\partial C_{s'}}{\partial s'} \frac{(1-\alpha_{s'}) C_{s'}}{C_{s_2}^2} k_{1ss_2}$$

$$\frac{\partial k_{2ss'}}{\partial s'} = \frac{\partial \alpha_{s'}}{\partial s'} \frac{C_{s'}^4}{C_{s_1}^4} k_{2ss_1} + 4\frac{\partial C_{s'}}{\partial s'} \frac{\alpha_{s'} C_{s'}^3}{C_{s_1}^4} k_{2ss_1} +$$

$$\left(-\frac{\partial \alpha_{s'}}{\partial s'}\right) \frac{C_{s'}^4}{C_{s_2}^4} k_{2ss_2} + 4\frac{\partial C_{s'}}{\partial s'} \frac{(1-\alpha_{s'}) C_{s'}^3}{C_{s_2}^4} k_{2ss_2}$$

$$\frac{\partial k_{3ss'}}{\partial s'} = \frac{\partial \alpha_{s'}}{\partial s'} \frac{C_{s'}^6}{C_{s_1}^6} k_{3ss_1} + 6\frac{\partial C_{s'}}{\partial s'} \frac{\alpha_{s'} C_{s'}^5}{C_{s_1}^6} k_{3ss_1} +$$

$$\left(-\frac{\partial \alpha_{s'}}{\partial s'}\right) \frac{C_{s'}^6}{C_{s_2}^6} k_{3ss_2} + 6\frac{\partial C_{s'}}{\partial s'} \frac{(1-\alpha_{s'}) C_{s'}^5}{C_{s_2}^6} k_{3ss_2}$$

It can be seen from the relationship described by the formula (4.4) that:

$$\frac{\partial s'}{\partial X_0} = a_3 \quad (4.11)$$

$$\frac{\partial \Delta x}{\partial s'} = \overline{x}\left(\frac{\partial k_{1ss'}}{\partial s'} r^2 + \frac{\partial k_{2ss'}}{\partial s'} r^4 + \frac{\partial k_{3ss'}}{\partial s'} r^6\right)$$

$$\frac{\partial \Delta y}{\partial s'} = \overline{y}\left(\frac{\partial k_{1ss'}}{\partial s'} r^2 + \frac{\partial k_{2ss'}}{\partial s'} r^4 + \frac{\partial k_{3ss'}}{\partial s'} r^6\right)$$

$$\frac{\partial \Delta x}{\partial X_0} = \frac{\partial \Delta x}{\partial s'}\frac{\partial s'}{\partial X_0} \quad \frac{\partial \Delta y}{\partial X_0} = \frac{\partial \Delta y}{\partial s'}\frac{\partial s'}{\partial X_0}$$

Through the description of the formula (4.3), partial derivatives of $x_l$ and $y_l$ relative to $X_0$ can be solved:

$$\frac{\partial x_l}{\partial X_0} = \frac{f(a_1\overline{Z}-a_3\overline{X})}{\overline{Z}^2} \quad \frac{\partial y_l}{\partial X_0} = \frac{f(a_2\overline{Z}-a_3\overline{Y})}{\overline{Z}^2} \quad (4.12)$$

Therefore, with reference to the formula (4.7), a partial derivative of an observed value relative to the term $X_0$ in the exterior orientation parameters is:

$$\frac{\partial x}{\partial X_0} = \frac{\partial x_l}{\partial X_0} - \frac{\partial \Delta x}{\partial X_0} \quad \frac{\partial y}{\partial X_0} = \frac{\partial y_l}{\partial X_0} - \frac{\partial \Delta y}{\partial X_0} \quad (4.13)$$

Likewise, partial derivatives of the observed value relative to other exterior orientation parameters can be obtained:

$$\frac{\partial s'}{\partial Y_0} = b_3 \quad \frac{\partial \Delta x}{\partial Y_0} = \frac{\partial \Delta x}{\partial s'}\frac{\partial s'}{\partial Y_0} \quad \frac{\partial \Delta y}{\partial Y_0} = \frac{\partial \Delta y}{\partial s'}\frac{\partial s'}{\partial Y_0} \quad (4.14)$$

$$\frac{\partial x_l}{\partial Y_0} = \frac{f(b_1\overline{Z}-b_3\overline{X})}{\overline{Z}^2} \quad \frac{\partial y_l}{\partial Y_0} = \frac{f(b_2\overline{Z}-b_3\overline{Y})}{\overline{Z}^2}$$

$$\frac{\partial x}{\partial Y_0} = \frac{\partial x_l}{\partial Y_0} - \frac{\partial \Delta x}{\partial Y_0} \quad \frac{\partial y}{\partial Y_0} = \frac{\partial y_l}{\partial X_0} - \frac{\partial \Delta y}{\partial X_0}$$

$$\frac{\partial s'}{\partial Z_0} = c_3 \quad \frac{\partial \Delta x}{\partial Z_0} = \frac{\partial \Delta x}{\partial s'}\frac{\partial s'}{\partial Z_0} \quad \frac{\partial \Delta y}{\partial Z_0} = \frac{\partial \Delta y}{\partial s'}\frac{\partial s'}{\partial Z_0} \quad (4.15)$$

$$\frac{\partial x_l}{\partial Z_0} = \frac{f(c_1\overline{Z}-c_3\overline{X})}{\overline{Z}^2} \quad \frac{\partial y_l}{\partial Z_0} = \frac{f(c_2\overline{Z}-c_3\overline{Y})}{\overline{Z}^2}$$

$$\frac{\partial x}{\partial Z_0} = \frac{\partial x_l}{\partial Z_0} - \frac{\partial \Delta x}{\partial Z_0} \quad \frac{\partial y}{\partial Z_0} = \frac{\partial y_l}{\partial Z_0} - \frac{\partial \Delta y}{\partial Z_0}$$

The description of partial derivatives of linear terms $x_l$ and $y_l$ relative to different angles is complex, and reference can be made to relevant literatures. Herein, only partial derivatives of $\Delta x$ and $\Delta y$ relative to different angles are analyzed.

$$\frac{\partial s'}{\partial Az} = -(\cos(El)\cos(Az)(X-X_0) + \cos(El)\sin(Az)(Y-Y_0)) \quad (4.16)$$

$$\frac{\partial \Delta x}{\partial Az} = \frac{\partial \Delta x}{\partial s'}\frac{\partial s'}{\partial Az} \quad \frac{\partial \Delta y}{\partial Az} = \frac{\partial \Delta y}{\partial s'}\frac{\partial s'}{\partial Az}$$

$$\frac{\partial x}{\partial Az} = \frac{\partial x_l}{\partial Az} - \frac{\partial \Delta x}{\partial Az} \quad \frac{\partial y}{\partial Az} = \frac{\partial y_l}{\partial Az} - \frac{\partial \Delta y}{\partial Az}$$

$$\frac{\partial s'}{\partial El} = \quad (4.17)$$
$$-(-\sin(El)\sin(Az)(X-X_0) + \sin(El)\cos(Az)(Y-Y_0) - \cos(El))$$

$$\frac{\partial \Delta x}{\partial El} = \frac{\partial \Delta x}{\partial s'}\frac{\partial s'}{\partial El} \quad \frac{\partial \Delta y}{\partial El} = \frac{\partial \Delta y}{\partial s'}\frac{\partial s'}{\partial El}$$

$$\frac{\partial x}{\partial El} = \frac{\partial x_l}{\partial El} - \frac{\partial \Delta x}{\partial El} \quad \frac{\partial y}{\partial El} = \frac{\partial y_l}{\partial El} - \frac{\partial \Delta y}{\partial El}$$

$$\frac{\partial s'}{\partial Ro} = 0 \quad \frac{\partial \Delta x}{\partial Ro} = 0 \quad \frac{\partial \Delta y}{\partial Ro} = 0 \quad (4.18)$$

$$\frac{\partial x}{\partial Ro} = \frac{\partial x_l}{\partial Ro} \quad \frac{\partial y}{\partial Ro} = \frac{\partial y_l}{\partial Ro}$$

The present technology uses one-sided self-calibration bundle adjustment, and interior parameters participating in the adjustment are $x_p$, $y_p$, f, $P_1$, $P_2$, $B_1$, $B_2$, and one-sided radial distortion parameters $k_{1ss_1}$, $k_{2ss_2}$, and $k_{3ss_3}$ of $S_2$.

$$\frac{\partial \Delta x}{\partial x_p} = -(K_{1ss'}r^2 + K_{2ss'}r^4 + K_{3ss'}r^6) + \overline{x}(-2\overline{x}) \quad (4.19)$$

$$(K_{1ss'} + 2K_{2ss'}r^2 + 3K_{3ss'}r^4) + P_1(-6\overline{x}) + 2P_2(-\overline{y}) - B_1$$

$$\frac{\partial \Delta y}{\partial x_p} = \overline{y}(-2\overline{x})(K_{1ss'} + 2K_{2ss'}r^2 + 3K_{3ss'}r^4) + P_2(-2\overline{x}) + 2P_1(-\overline{y})$$

$$\frac{\partial \Delta x}{\partial y_p} =$$

$$\overline{x}(-2\overline{y})(K_{1ss'} + 2K_{2ss'}r^2 + 3K_{3ss'}r^4) + P_1(-2\overline{y}) + 2P_2(-\overline{x}) - B_2$$

$$\frac{\partial \Delta y}{\partial y_p} = -(K_{1ss'}r^2 + K_{2ss'}r^4 + K_{3ss'}r^6) +$$

$$\overline{y}(-2\overline{y})(K_{1ss'} + 2K_{2ss'}r^2 + 3K_{3ss'}r^4) + P_2(-6\overline{y}) + 2P_1(-\overline{x})$$

$$\frac{\partial x}{\partial x_p} = 1 - \frac{\partial \Delta x}{\partial x_p} \quad \frac{\partial y}{\partial x_p} = -\frac{\partial \Delta y}{\partial x_p}$$

$$\frac{\partial x}{\partial y_p} = -\frac{\partial \Delta x}{\partial y_p} \quad \frac{\partial y}{\partial y_p} = 1 - \frac{\partial \Delta y}{\partial y_p} \quad (4.20)$$

$$\frac{\partial x}{\partial f} = -\frac{\overline{X}}{\overline{Z}} \quad \frac{\partial v}{\partial f} = -\frac{\overline{Y}}{\overline{Z}} \quad (4.21)$$

$$\frac{\partial K_{1ss'}}{\partial K_{1ss_2}} = (1-\alpha_{s'})\frac{C_{s'}^2}{C_{s_2}^2} \quad \frac{\partial K_{2ss'}}{\partial K_{2ss_2}} = (1-\alpha_{s'})\frac{C_{s'}^4}{C_{s_2}^4} \quad (4.22)$$

$$\frac{\partial K_{3ss'}}{\partial K_{3ss_2}} = (1-\alpha_{s'})\frac{C_{s'}^6}{C_{s_2}^6} \quad \frac{\partial x}{\partial K_{1ss_2}} = -\overline{x}r^2\frac{\partial K_{1ss'}}{\partial K_{1ss_2}}$$

$$\frac{\partial x}{\partial K_{2ss_2}} = -\overline{x}r^4\frac{\partial K_{2ss'}}{\partial K_{2ss_2}} \quad \frac{\partial x}{\partial K_{3ss_2}} = -\overline{x}r^6\frac{\partial K_{3ss'}}{\partial K_{3ss_2}}$$

$$\frac{\partial y}{\partial K_{1ss_2}} = -\overline{y}r^2\frac{\partial K_{1ss'}}{\partial K_{1ss_2}} \quad \frac{\partial y}{\partial K_{2ss_2}} = -\overline{y}r^4\frac{\partial K_{2ss'}}{\partial K_{2ss_2}} \quad (4.23)$$

$$\frac{\partial y}{\partial K_{3ss_2}} = -\overline{y}r^6\frac{\partial K_{3ss'}}{\partial K_{3ss_2}}$$

$$\frac{\partial x}{\partial P_1} = -(2\overline{x}^2 + r^2) \quad \frac{\partial y}{\partial P_1} = -2\overline{x}\overline{y} \quad (4.24)$$

$$\frac{\partial y}{\partial P_2} = -2\overline{x}\overline{y} \quad \frac{\partial y}{\partial P_2} = -(2\overline{y}^2 + r^2) \quad (4.25)$$

$$\frac{\partial x}{\partial B_1} = -\overline{x} \quad \frac{\partial y}{\partial B_1} = 0 \quad (4.26)$$

$$\frac{\partial x}{\partial B_2} = -\overline{y} \quad \frac{\partial y}{\partial B_2} = 0 \quad (4.27)$$

Each term in $B_{ij}$ is solved through the following process:

$$\frac{\partial x}{\partial X} = -\frac{\partial x}{\partial X_o} \quad \frac{\partial x}{\partial Y} = -\frac{\partial x}{\partial Y_o} \quad \frac{\partial x}{\partial Z} = -\frac{\partial x}{\partial Z_o} \quad (4.28)$$

$$\frac{\partial y}{\partial X} = -\frac{\partial y}{\partial X_o} \quad \frac{\partial y}{\partial Y} = -\frac{\partial y}{\partial Y_o} \quad \frac{\partial z}{\partial Z} = -\frac{\partial z}{\partial Z_o} \quad (4.29)$$

d3) performing a partitioning operation on the normal equation;

Assuming that a dual-camera photogrammetry system performs photographing and measurement on n scale bar positions, the error equation set is:

$$\begin{bmatrix} v_{1,11} \\ v_{1,12} \\ v_{1,21} \\ v_{1,22} \\ \vdots \\ v_{1,i1} \\ v_{1,i2} \\ \vdots \\ v_{1,n1} \\ v_{1,n2} \\ v_{2,11} \\ v_{2,12} \\ v_{2,21} \\ v_{2,22} \\ \vdots \\ v_{2,j1} \\ v_{2,j2} \\ \vdots \\ v_{2,n1} \\ v_{2,n2} \end{bmatrix} + \begin{bmatrix} l_{1,11} \\ l_{1,12} \\ l_{1,21} \\ l_{1,22} \\ \vdots \\ l_{1,i1} \\ l_{1,i2} \\ \vdots \\ l_{1,n1} \\ l_{1,n2} \\ l_{2,11} \\ l_{2,12} \\ l_{2,21} \\ l_{2,22} \\ \vdots \\ l_{2,j1} \\ l_{2,j2} \\ \vdots \\ l_{2,n1} \\ l_{2,n2} \end{bmatrix} = \begin{bmatrix} A_{1,11} & 0 & B_{1,11} & 0 & 0 & 0 & \cdots & 0 & 0 & \cdots & 0 & 0 \\ A_{1,12} & 0 & 0 & B_{1,12} & 0 & 0 & \cdots & 0 & 0 & \cdots & 0 & 0 \\ A_{1,21} & 0 & 0 & 0 & B_{1,21} & 0 & \cdots & 0 & 0 & \cdots & 0 & 0 \\ A_{1,22} & 0 & 0 & 0 & 0 & B_{1,22} & \cdots & 0 & 0 & \cdots & 0 & 0 \\ \vdots & \vdots & \vdots & \vdots & \vdots & \vdots & & \vdots & \vdots & & \vdots & \vdots \\ A_{1,j1} & 0 & 0 & 0 & 0 & 0 & \cdots & B_{1,j1} & 0 & \cdots & 0 & 0 \\ A_{1,j2} & 0 & 0 & 0 & 0 & 0 & \cdots & 0 & B_{1,j2} & \cdots & 0 & 0 \\ \vdots & \vdots & \vdots & \vdots & \vdots & \vdots & & \vdots & \vdots & & \vdots & \vdots \\ A_{1,n1} & 0 & 0 & 0 & 0 & 0 & \cdots & 0 & 0 & \cdots & B_{1,n1} & 0 \\ A_{1,n2} & 0 & 0 & 0 & 0 & 0 & \cdots & 0 & 0 & \cdots & 0 & B_{1,n2} \\ 0 & A_{2,11} & B_{2,11} & 0 & 0 & 0 & \cdots & 0 & 0 & \cdots & 0 & 0 \\ 0 & A_{2,12} & 0 & B_{2,12} & 0 & 0 & \cdots & 0 & 0 & \cdots & 0 & 0 \\ 0 & A_{2,21} & 0 & 0 & B_{2,21} & 0 & \cdots & 0 & 0 & \cdots & 0 & 0 \\ 0 & A_{2,22} & 0 & 0 & 0 & B_{2,22} & \cdots & 0 & 0 & \cdots & 0 & 0 \\ \vdots & \vdots & \vdots & \vdots & \vdots & \vdots & & \vdots & \vdots & & \vdots & \vdots \\ 0 & A_{2,j1} & 0 & 0 & 0 & 0 & \cdots & B_{2,j1} & 0 & \cdots & 0 & 0 \\ 0 & A_{2,j2} & 0 & 0 & 0 & 0 & \cdots & 0 & B_{2,j2} & \cdots & 0 & 0 \\ \vdots & \vdots & \vdots & \vdots & \vdots & \vdots & & \vdots & \vdots & & \vdots & \vdots \\ 0 & A_{2,n1} & 0 & 0 & 0 & 0 & \cdots & 0 & 0 & \cdots & B_{2,n1} & 0 \\ 0 & A_{2,n2} & 0 & 0 & 0 & 0 & \cdots & 0 & 0 & \cdots & 0 & B_{2,n2} \end{bmatrix} \begin{bmatrix} \delta_1 \\ \delta_2 \\ \delta_{11} \\ \delta_{12} \\ \delta_{21} \\ \delta_{22} \\ \vdots \\ \delta_{j1} \\ \delta_{j2} \\ \vdots \\ \delta_{n1} \\ \delta_{n2} \end{bmatrix} \Rightarrow v + l = A\vec{\delta} \quad (4.30)$$

where the symbol subscript i,jk represents the $k^{th}$ endpoint on (i=1,2, j=1,2, ... n, k=1,2) the $j^{th}$ reference length for the $i^{th}$ camera.

Assuming $v^T v \rightarrow \min$, the to-be-solved parameter increment $\delta$ is solved by using the following formula:

$$(A^T A)\vec{\delta} = A^T l \Rightarrow N \vec{\delta} = W \quad (4.31)$$

In view of the sparsity of A, a regular partitioned description may be made for $A^T A$ and $A^T l$ according to indexes of the image and the target point:

$$A^T A = N = \begin{bmatrix} N_{11} & N_{12} \\ (32\times 32) & (32\times 6n) \\ N_{21} & N_{22} \\ (6n\times 32) & (6n\times 6n) \end{bmatrix} \quad A^T l = W = \begin{bmatrix} w_1 \\ (32\times 1) \\ w_2 \\ (6n\times 1) \end{bmatrix}$$

$$N_{11} = \begin{bmatrix} \sum_{j=1}^{n}\sum_{k=1}^{2} A_{1,jk}^T A_{1,jk} & 0 \\ 0 & \sum_{j=1}^{n}\sum_{k=1}^{2} A_{2,jk}^T A_{2,jk} \end{bmatrix}$$

$$N_{22} = \begin{bmatrix} \sum_{i=1}^{2} B_{i,11}^T B_{i,11} & 0 & 0 & 0 & \cdots & 0 & 0 & \cdots & 0 & 0 \\ 0 & \sum_{i=1}^{2} B_{i,12}^T B_{i,12} & 0 & 0 & \cdots & 0 & 0 & \cdots & 0 & 0 \\ 0 & 0 & \sum_{i=1}^{2} B_{i,21}^T B_{i,21} & 0 & \cdots & 0 & 0 & \cdots & 0 & 0 \\ 0 & 0 & 0 & \sum_{i=1}^{2} B_{i,22}^T B_{i,22} & \cdots & 0 & 0 & \cdots & 0 & 0 \\ \vdots & \vdots & \vdots & \vdots & \vdots & \vdots & \vdots & \vdots & \vdots \\ 0 & 0 & 0 & 0 & \cdots & \sum_{i=1}^{2} B_{i,j1}^T B_{i,j1} & 0 & \cdots & 0 & 0 \\ 0 & 0 & 0 & 0 & \cdots & 0 & \sum_{i=1}^{2} B_{i,j2}^T B_{i,j2} & \cdots & 0 & 0 \\ \vdots & \vdots & \vdots & \vdots & \vdots & \vdots & \vdots & \vdots & \vdots \\ 0 & 0 & 0 & 0 & \cdots & 0 & 0 & \cdots & \sum_{i=1}^{2} B_{i,n1}^T B_{i,n1} & 0 \\ 0 & 0 & 0 & 0 & \cdots & 0 & 0 & \cdots & 0 & \sum_{i=1}^{2} B_{i,n2}^T B_{i,n2} \end{bmatrix}$$

$$N_{12} = \begin{bmatrix} A_{1,11}^T B_{1,11} & A_{1,12}^T B_{1,12} & A_{1,21}^T B_{1,21} & A_{1,22}^T B_{1,22} & \cdots & A_{1,j1}^T B_{1,j1} & A_{1,j2}^T B_{1,j2} & \cdots & A_{1,n1}^T B_{1,n1} & A_{1,n2}^T B_{1,n2} \\ A_{2,11}^T B_{2,11} & A_{2,12}^T B_{2,12} & A_{2,21}^T B_{2,21} & A_{2,22}^T B_{2,22} & \cdots & A_{2,j1}^T B_{2,j1} & A_{2,j2}^T B_{2,j2} & \cdots & A_{2,n1}^T B_{2,n1} & A_{2,n2}^T B_{2,n2} \end{bmatrix}$$

$$N_{21} = N_{12}^T$$

$$w_1 = \begin{bmatrix} \sum_{j=1}^{n}\sum_{k=1}^{2} A_{1,jk}^T l_{1,jk} \\ \sum_{j=1}^{n}\sum_{k=1}^{2} A_{2,jk}^T l_{2,jk} \end{bmatrix}$$

$$w_2 = \begin{bmatrix} \sum_{i=1}^{2} B_{i,11}^T l_{i,11} \\ \sum_{i=1}^{2} B_{i,12}^T l_{i,12} \\ \sum_{i=1}^{2} B_{i,21}^T l_{i,21} \\ \sum_{i=1}^{2} B_{i,22}^T l_{i,22} \\ \sum_{i=1}^{2} B_{i,j1}^T l_{i,j1} \\ \sum_{i=1}^{2} B_{i,j2}^T l_{i,j2} \\ \sum_{i=1}^{2} B_{i,n1}^T l_{i,n1} \\ \sum_{i=1}^{2} B_{i,n2}^T l_{i,n2} \end{bmatrix}$$

d4) obtaining self-calibration bundle adjustment with length constraints;

Constraint conditions are described by using the following formula:

$$\underset{(n\times(32+6n))(32+6n)\times 1}{C} \vec{\delta} + \underset{(n\times 1)}{W_x} = 0 \qquad (4.32)$$

$$C = \begin{bmatrix} 0 & 0 & \frac{\partial L_1}{\partial c_{11}} & \frac{\partial L_1}{\partial c_{12}} & 0 & 0 & \ldots & 0 & 0 & \ldots & 0 & 0 \\ 0 & 0 & 0 & 0 & \frac{\partial L_2}{\partial c_{21}} & \frac{\partial L_2}{\partial c_{22}} & \ldots & 0 & 0 & \ldots & 0 & 0 \\ \vdots & \vdots & \vdots & \vdots & \vdots & \vdots & \vdots & \vdots & \vdots & \vdots & \vdots & \vdots \\ 0 & 0 & 0 & 0 & 0 & 0 & \ldots & \frac{\partial L_j}{\partial c_{j1}} & \frac{\partial L_j}{\partial c_{j2}} & \ldots & 0 & 0 \\ \vdots & \vdots & \vdots & \vdots & \vdots & \vdots & \vdots & \vdots & \vdots & \vdots & \vdots & \vdots \\ 0 & 0 & 0 & 0 & 0 & 0 & \ldots & 0 & 0 & \ldots & \frac{\partial L_n}{\partial c_{n1}} & \frac{\partial L_n}{\partial c_{n2}} \end{bmatrix}$$

$$W_x = \begin{bmatrix} L - L_1 \\ L - L_2 \\ \vdots \\ L - L_j \\ \vdots \\ L - L_n \end{bmatrix}$$

where L is a measured length value, $L_j$ is the length of the scale bar at the $j^{th}$ position reconstructed by the photogrammetry system, and a method for solving a partial derivative of the length relative to spatial coordinates of the corresponding endpoint is:

$$\frac{\partial L_j}{\partial c_{j1}} = \begin{bmatrix} \frac{x_{j1} - x_{j2}}{L_j} & \frac{y_{j1} - y_{j2}}{L_j} & \frac{z_{j1} - z_{j2}}{L_j} \end{bmatrix}$$

$$\frac{\partial L_j}{\partial c_{j2}} = \begin{bmatrix} -\frac{x_{j1} - x_{j2}}{L_j} & -\frac{y_{j1} - y_{j2}}{L_j} & -\frac{z_{j1} - z_{j2}}{L_j} \end{bmatrix}$$

Then, a least-squares solution and corresponding contact vector of the formula (4.31) under the constraint conditions described by the formula (4.32) are:

$$\vec{\delta} = (N^{-1} - N^{-1}C^T N_{cc}^{-1} C N^{-1})W - N^{-1} C^T N_{cc}^{-1} W_x \qquad (4.33)$$

$$N_{cc} = C N^{-1} C^T$$

$$K_s = N_{cc}^{-1}(C N^{-1} W + W_x)$$

d5) evaluating precision of the photogrammetry system;

The mean error of weight unit for the photogrammetry system is:

$$\hat{s}_0 = \sqrt{\frac{V^T V}{3n - 32}} \quad (4.34)$$

To ensure the orientation precision, it is recommended that scale bars be placed at 60 or more positions.

An error covariance matrix of interior and exterior orientation parameters of the two cameras and spatial coordinates of feature points of the scale bar is:

$$\underset{((32+6n)\times(32+6n))}{C} = \hat{s}_0^2 \left( N^{-1} - \underset{((32+6n)\times(32+6n))}{N^{-1} C^T N_{cc}^{-1} C N^{-1}} \right) \quad (4.35)$$

d6) performing adaptive proportional adjustment of error equation terms;

Unknown variables to be solved vary considerably in order of magnitude, especially for interior parameters. For example, generally terms K1, P1, P2, B1 and B2 have 10-5, term K2 has 10-7, and term K3 has 10-11. Such a considerable difference in order of magnitude leads to the ill-conditioned problem of the matrix A in the error equation (4.31). Due to the common problems in numerical computation such as machine precision, loss of low-order digits, and division of a large number by a small number, the computational result of the normal equation may be greatly affected. This often leads to problems such as matrix rank deficiency. To unify the orders of magnitude of all the terms in the error equation, an adaptive proportional adjustment technique is designed herein.

Each time the adjustment iteration process begins, the order of magnitude Mj and an adjustment coefficient kj of each column in the error equation are calculated first, using the following method:

$$M_j = \text{average}(\text{round}(-\ln(A(:,j)))) \Rightarrow k_j = 10^{M_j} \quad (4.36)$$

Then, the computational result of each column is multiplied by a corresponding proportionality coefficient, to obtain an adjusted error equation:

$$A' = A \begin{bmatrix} k_1 & 0 & \cdots & 0 \\ 0 & k_2 & \cdots & 0 \\ \vdots & \vdots & \vdots & \vdots \\ 0 & 0 & \cdots & k_u \end{bmatrix}$$

A relationship between an unknown variable $\vec{\delta}'$ and $\vec{\delta}$ to be solved is calculated by using the formula (4.31):

$$\vec{\delta} = \begin{bmatrix} k_1 & 0 & \cdots & 0 \\ 0 & k_2 & \cdots & 0 \\ \vdots & \vdots & \vdots & \vdots \\ 0 & 0 & \cdots & k_u \end{bmatrix} \vec{\delta}, \quad (4.37)$$

As proved by both simulation and experiments, such adaptive proportional adjustment eliminates the ill-conditioned problem of the normal equation in numerical computation, and provides higher adjustment stability and adjustment precision.

Step e

After the orientation process is completed, interior and exterior orientation parameters of the two cameras are fixed, and then spatial coordinates of points to be measured are solved by using a least-squares technique. In the process of solving the spatial coordinates, because there is no correlation between the measured points, the process may be performed point by point, thereby avoiding the time consumption caused by large-scale matrix operations and improving the performance of dynamic measurement. This is in essence a direct linear transformation method.

According to an embodiment of the present invention, a specific method for performing traceable evaluation of orientation precision of the photogrammetry system is:

e1) describing an error equation of a single imaging point;

$$\hat{l}_{ij} = l_{ij} + v_{ij} = K_{ij}\hat{x}_{ij} \Rightarrow \begin{bmatrix} x_{ij} - \varphi_x(X_{ij}^0) \\ y_{ij} - \varphi_y(X_{ij}^0) \end{bmatrix} + \begin{bmatrix} v_{xij} \\ v_{yij} \end{bmatrix} = B_{ij} \begin{bmatrix} \Delta X_j \\ \Delta Y_j \\ \Delta Z_j \end{bmatrix} = B_{ij}\delta_j \quad (5.1)$$

$$i = 1, 2; j = 1, 2, \ldots n$$

The sparse matrix $B_{ij}$ is a partial derivative matrix of image plane coordinates relative to spatial coordinates, and is solved by using the formulas (4.30) and (4.31).

e2) when the photogrammetry system includes two cameras, an error equation set corresponding to a spatial point [X Y Z] is:

$$\begin{bmatrix} l_1 \\ l_2 \end{bmatrix}_{(4\times 1)} + \begin{bmatrix} v_1 \\ v_2 \end{bmatrix}_{(4\times 1)} = \begin{bmatrix} B_1 \\ B_2 \end{bmatrix}_{(4\times 3)} \begin{bmatrix} \Delta X \\ \Delta Y \\ \Delta Z \end{bmatrix} \Rightarrow l + v = B\delta \quad (5.2)$$

e3) a corresponding normal equation and coordinate correction amount are:

$$(B^T B)\delta = B^T l \quad \delta = (B^T B)^{-1} B^T l \quad (5.3)$$

e4) the orientation precision evaluation is evaluation of the length measurement, and is performed by using data in the orientation process. Coordinates of endpoints of 2n scale bars are reconstructed by using the formula (5.3), and then a measured value of the length of the corresponding scale bar is solved:

$$L_1 \ L_2 \ \ldots \ L_n$$

e5) an average value of measurement results is:

$$\bar{L} = \frac{\sum_{j=1}^{n} L_j}{n} \quad (5.4)$$

e6) performing scaling by using a ratio of an average length to a gage length as an orientation result (translation amount of exterior orientation parameter):

$$s = \frac{L}{\bar{L}} \quad T_1' = sT_1 \quad T_2' = sT_2 \quad (5.5)$$

$$L_1' = sL_1 \quad L_2' = sL_2 \quad \ldots \quad L_n' = sL_n \quad (5.6)$$

and performing an uncertainty analysis on the length measurement result, to obtain an orientation precision evaluation:

$$u(L'_i) = \sqrt{\frac{\sum_{i=1}^{n}(L'_i - L)^2}{n-1}} = \sqrt{\frac{\sum_{i=1}^{n}\Delta L'^2_i}{n-1}} = su(L_i) \qquad (5.7)$$

e7) a quality parameter of a measurement instrument is described as a multiple of the uncertainty of the length:

$$B = ku(L'_i) \qquad (5.8)$$

e8) a relative error of each length is:

$$\Delta r'_i = \frac{L'_i - L}{L} = \frac{L_i - \overline{L}}{\overline{L}} = \Delta r_i \qquad (5.9)$$

e9) the relative error in length measurement is equal to the relative error in length measurement before scaling is performed, and therefore, an uncertainty of the relative error in length measurement is also equal to an uncertainty of the original relative error in length measurement:

$$u(\Delta r'_i) = u(\Delta r_i) = \frac{u(L_i)}{\overline{L}} \qquad (5.10)$$

According to the method for implementing high-precision orientation and evaluating orientation precision of a large-scale dynamic photogrammetry system of the present invention, the following verification experiment was carried out:

A photogrammetry system used in the experiment includes two industrial cameras. As shown in FIG. 3, a scale bar having a length of about 950 mm is used for orientation, and a reference length is indicated by backlight reflection code points at two ends of the scale bar. The volume of the measurement environment is about 3.6 m×2.4 m×2.4 m. The scale bar is moved in the measurement environment and imaged, self-calibration positioning and orientation of the photogrammetry system is implemented by using the method of the present invention, and the orientation precision of the system is evaluated by using the evaluation method according to claim 10. Results of three orientation experiments are shown in Table 1 and Table 2. Table 1 shows an orientation result of self-calibration bundle adjustment aimed at the smallest image plane error. Table 2 shows an orientation result of self-calibration bundle adjustment with multiple length constraints according to the present technology.

TABLE 1 orientation result of conventional self-calibration bundle adjustment

| | | standard deviation of image plane error | | length measurement error | |
| --- | --- | --- | --- | --- | --- |
| | | direction x | direction y | standard deviation | relative error uncertainty |
| orientation experiment 1 | camera 1 | 2.85E-05 | 4.24E-04 | 3.800 | 1/250 |
| | camera 2 | 2.32E-05 | 3.43E-04 | | |

TABLE 1-continued orientation result of conventional self-calibration bundle adjustment

| | | standard deviation of image plane error | | length measurement error | |
| --- | --- | --- | --- | --- | --- |
| | | direction x | direction y | standard deviation | relative error uncertainty |
| orientation experiment 2 | the camera 1 | 1.60E-05 | 4.72E-04 | 6.271 | 1/150 |
| | camera 2 | 1.53E-05 | 4.92E-04 | | |
| orientation experiment 3 | camera 1 | 1.71E-05 | 3.02E-04 | 3.474 | 1/270 |
| | camera 2 | 1.43E-05 | 2.88E-04 | | |

TABLE 2 orientation result of self-calibration bundle adjustment with multiple length constraints

| | | standard deviation of image plane error | | length measurement error | |
| --- | --- | --- | --- | --- | --- |
| | | direction x | | | direction x |
| orientation experiment 1 | camera 1 | 1.80E-04 | 4.60E-04 | 0.060 | 1/15800 |
| | camera 2 | 1.85E-04 | 4.18E-04 | | |
| orientation experiment 2 | the camera 1 | 2.15E-04 | 5.43E-04 | 0.064 | 1/14800 |
| | camera 2 | 2.28E-04 | 5.32E-04 | | |
| orientation experiment 3 | camera 1 | 1.47E-04 | 3.68E-04 | 0.051 | 1/18700 |
| | camera 2 | 1.89E-04 | 3.34E-04 | | |

It can be seen from comparison of standard deviations of image plane errors of the three orientation experiments in Table 1 and Table 2 that in the conventional self-calibration method, the error in the direction x of the image plane is reduced to a ignorable degree, and is smaller than the image plane error in the other direction by one order of magnitude. This is obviously incorrect, because error levels in two directions of imaging should approximate. Such an adjustment method leads to an incorrect self-calibration result and incorrect positioning and orientation result, and the corresponding length error is large. For the self-calibration adjustment technique with multiple length constraints according to the present invention, due to the constraint of the space length, the image plane error is not the only factor that determines the adjustment result, the image plane error is more reasonable, and the corresponding length error is significantly reduced.

The experimental results indicate that the use of the relative error in length measurement as an indicator of evaluation can ignore the analytical complexity caused by the reference length measurement error. If the length measurement is traceable, the precision of the photogrammetry system can also be evaluated according to an absolute measurement error, and the result of evaluation is also traceable.

Based on the above, in the present invention, on-site positioning and orientation of a dual-camera large-scale dynamic photogrammetry system is completed by using a single scale bar. The measurement space is divided into regions so that the distance between the left and right cameras is equal to the region length of the divided space, and the gauge attitude and the camera position are adjusted at the same time during the photographing process, making the length orientation field more reliable. Preliminary orientation is performed by combining a five-point method with the space length ratio, so that the solution loss problem in special cases can be overcome, and a feasible solution can be accurately determined in multiple solutions. In addition, the correlation between parameters can be overcome by using self-calibration bundle adjustment with multiple space length constraints, thereby improving the overall orientation precision of the photogrammetry system. The statistical result of the length measurement error provides a traceable objective evaluation indicator. The experimental result shows that the relative error in length measurement of the present technology reaches $1/15000$.

The above descriptions are merely preferred embodiments of the present invention, but are not intended to limit the scope of implementation of the present invention. Hence, any equivalent variations or modifications made in accordance with the structures, features and principles described in the claims of the present invention shall fall within the scope of the claims of the present invention.

What is claimed is:

1. A method for implementing high-precision orientation and evaluating orientation precision of a large-scale dynamic photogrammetry system, comprising steps:
   a) selecting a scale bar, arranging code points at two ends of the scale bar, and performing length measurement on the scale bar;
   b) evenly dividing a measurement space into multiple regions, sequentially placing the scale bar in each region, and photographing the scale bar by using left and right cameras, wherein continuous photographing is carried out in the following manner:
      b1) adjusting left and right cameras so that fields of view of the left and right cameras fully cover the scale bar, synchronously moving the left and right cameras along a perpendicular direction of a line connecting the code points at the two ends of the scale bar, and at the same time rotating the scale bar by using the perpendicular direction of the line connecting the code points at the two ends of the scale bar as an axis of rotation; and
      b2) adjusting the left and right cameras, synchronously moving the left and right cameras along the perpendicular direction of the line connecting the code points at the two ends of the scale bar in a direction opposite to that in the step b1), and at the same time rotating the scale bar in a direction opposite to that in the step b1);
   c) performing preliminary relative positioning and orientation of the photogrammetry system according to images shot by the left and right cameras;
   d) limiting self-calibration bundle adjustment by using multiple length constraints, adjustment parameters comprising principal point, principal distance, radial distortion, eccentric distortion, in-plane distortion, exterior orientation parameter and spatial point coordinate;
   e) performing traceable evaluation of orientation precision of the photogrammetry system.

2. The method according to claim 1, wherein a distance between the left and right cameras is the same as a region length according to which the measurement space is evenly divided.

3. The method according to claim 1, wherein the photographing process of the step b) is repeated multiple times.

4. The method according to claim 1, wherein the step c comprises the following steps:
   c1) determining a solution space of a fundamental matrix by using a five-point method: automatically selecting five imaging points in a position of the scale bar, wherein positions of the imaging points are a center and four vertexes of the shot image, and the automatic selection is performed using the following algorithm:

$$abs(xl_i)+abs(yl_i)+abs(xr_i)+abs(yr_i) \to \min$$

$$(xl_i)+(yl_i)+(xr_i)+(yr_i) \to \max$$

$$(-xl_i)+(yl_i)+(-xr_i)+(yr_i) \to \max$$

$$(-xl_i)+(-yl_i)+(-xr_i)+(-yr_i) \to \max$$

$$(xl_i)+(-yl_i)+(xr_i)+(-yr_i) \to \max$$

wherein [xli yli] represents image plane coordinates of the $i^{th}$ point captured by the left camera, and [xri yri] represents image point coordinates of the $i^{th}$ point captured by the right camera; and
   c2) obtaining a solution of an essential matrix by using an elimination method.

5. The method according to claim 4, wherein the obtaining of the solution of the essential matrix in the step c2) comprises the following key steps:
   c21) building a tenth-degree polynomial of an unknown number w;
   c22) solving a real root of the tenth-degree polynomial in the step c21; and
   c23) judging the solution of the essential matrix.

6. The method according to claim 5, wherein in a method of building the tenth-degree polynomial of w in the step c21, a Toeplitz matrix is used:
   c211) describing all polynomials as an array:

$$a_m x^m + A_{m-1} x^{m-1} + \ldots + a_2 x^2 + a_1 x + a_0 \; A=[a_m a_{m-1} \ldots a_2 a_1 a_0]^T$$

$$b_n x^n + b_{n-1} x^{n-1} + \ldots + b_2 x^2 + b_1 x + b_0 \; B=[b_n b_{n-1} \ldots b_2 b_1 b_0]^T; \text{ and}$$

c212) performing programming by using the Toeplitz matrix to compute polynomial multiplication, with a formula being:

$$C = T * B = \begin{bmatrix} a_m & 0 & 0 & \ldots & 0 \\ a_{m-1} & a_m & 0 & \ldots & 0 \\ a_{m-2} & a_{m-1} & a_m & \ldots & 0 \\ \vdots & \vdots & \vdots & \vdots & \vdots \\ 0 & a_0 & a_1 & \ldots & a_m \\ \vdots & \vdots & \vdots & \vdots & \vdots \\ 0 & 0 & 0 & 0 & a_0 \end{bmatrix} \begin{bmatrix} b_n \\ b_{n-1} \\ \vdots \\ b_1 \\ b_0 \end{bmatrix}$$

wherein T is a Toeplitz matrix corresponding to a polynomial A, a quantity of columns in T is equal to a quantity of elements in B, and a quantity of rows in T is equal to (m+1)+(n+1)−1.

7. The method according to claim 6, wherein the step c212 further comprises: performing programming by using the Toeplitz matrix to compute polynomial division, specifically comprising the following steps:

c213) describing n as n=T(d)q+r by using a Toeplitz matrix of d, wherein it is set that a numerator polynomial is n, a denominator polynomial is d, a quotient is q, and a remainder is r; and c214) calculating an optimal solution of a quotient of the polynomial division: $q=(T^TT)^{-1}T^Tn$.

8. The method according to claim 5, wherein a method for solving the real root of the tenth-degree polynomial in the step c22 is:

c221) building a Sturm sequence of the tenth-degree polynomial, with a formula being:

$$p_0(x)=p(x)$$

$$p_1(x)=p'(x)$$

$$p_2(x)=-\text{rem}(p_0,p_1)$$

$$p_3(x)=-\text{rem}(p_1,p_2)$$

.

.

.

$$0=-\text{rem}(p_{m-1},p_m)$$

wherein rem represents calculating the remainder of the polynomial, and P(x) is a known tenth-degree polynomial;

c222) searching all single intervals of the polynomial by recursive dichotomy in combination with the Sturm's Theorem; and c223) after the single intervals are obtained, calculating a numerical solution of a real root of |C(w)|=0 in each single interval by dichotomy.

9. The method according to claim 1, wherein the step d comprises the following steps:

d1) obtaining a camera imaging model;

d2) building an error equation of the photogrammetry system;

d3) performing adaptive proportional adjustment of error equation terms;

d4) performing a partitioning operation on the normal equation;

d5) obtaining self-calibration bundle adjustment with length constraints; and d6) evaluating precision of the photogrammetry system.

10. The method according to claim 1, wherein the step e of performing traceable evaluation of orientation precision of the photogrammetry system is performed by using direct linear transformation, and comprises the following steps:

e1) obtaining an error equation of a single imaging point;

e2) when the photogrammetry system comprises two cameras, obtaining an error equation set corresponding to a spatial point [X Y Z];

e3) obtaining a corresponding normal equation and coordinate correction amount, and optimizing spatial point coordinates through multiple iterations;

e4) obtaining a measured value of a corresponding length of the scale bar through the step e3;

e5) obtaining an average value of measurement results of lengths of the scale bar in all orientations;

e6) performing scaling by using a ratio of an average length to a gage length as an orientation result, and performing an uncertainty analysis on the length measurement result, to obtain an orientation precision evaluation;

e7) obtaining a quality parameter of a measurement instrument;

e8) calculating a relative error of each length; and e9) calculating an uncertainty of the relative error in length measurement.

* * * * *